United States Patent Office 2,834,753
Patented May 13, 1958

2,834,753

REMOVAL OF POLYMERIZING AGENTS FROM CONVERTIBLE ORGANOPOLYSILOXANES

Frederic W. Hammesfahr and Robert L. Hatch, Pittsfield, Mass., assignors to General Electric Company, a corporation of New York No Drawing. Application December 3, 1953
Serial No. 396,067

3 Claims. (Cl. 260—46.5)

This invention is concerned with a method for removing polymerizing or rearrangement agents from convertible organopolysiloxanes. More particularly, the invention relates to a process for the direct removal of small amounts of polymerizing agents contained in high viscosity convertible organopolysiloxanes, which are obtained by polymerizing low molecular weight organopolysiloxanes to high molecular weight convertible organopolysiloxanes by means of the aforesaid polymerizing agents, which process comprises kneading the aforesaid convertible organopolysiloxane containing the polymerizing agent while simultaneously intimately dispersing water throughout the convertible organopolysiloxane and thereafter removing the water containing the polymerizing agent.

In the preparation of silicone rubbers, which in the cured, substantially infusible and insoluble state have found eminent use in many applications where continued exposure to elevated temperatures without undue deterioration is a requirement, the convertible organopolysiloxanes from which the cured products are made, are obtained by polymerizing low molecular weight organopolysiloxanes, either by themselves or mixtures of organopolysiloxanes, with condensing or polymerizing agents to higher molecular weight organopolysiloxanes, which are the convertible organopolysiloxanes subsequently mixed with a filler and cured with curing agents, such as benzoyl peroxide, tertiary butyl perbenzoate, etc. at elevated temperatures. In obtaining the convertible organopolysiloxanes, relatively small amounts of a polymerizing agent (usually water-soluble) of the order of about 0.001 to about 1 to 2 percent, by weight, based on the weight of the starting organopolysiloxane, are employed for converting the low molecular weight products to high molecular weight compositions. Among the polymerizing or rearranging agents as they are often referred to, which are employed are, for instance, alkali-metal hydroxide, such as potassium hydroxides, sodium hydroxide, cesium hydroxide, etc.: ferric chloride, benzoyl peroxide, etc. After conversion to the convertible organopolysiloxane state, it has been found essential to remove these polymerizing agents (for brevity these agents together with reaction products of certain of these agents, particularly alkaline agents such as KOH, which form alkaline salts of the polysiloxane having terminal $$-\underset{|}{\overset{|}{\text{Si}}}\text{OK units}$$

will hereinafter be referred to as "polymerizing agents" and will cover "condensing agents," "rearranging agents" or "equilibrating agents") in order to prevent undesirable depolymerization of the organopolysiloxane when it is later subjected to the elevated temperatures at which curing of the convertible organopolysiloxane usually takes place, or when used in high temperature applications.

To our knowledge, no commercially successful method has been devised for removing the aforesaid polymerizing agent from the convertible organopolysiloxane. It has been suggested in U. S. Patent 2,430,032 that polymerizing agents such as ferric chloride may be removed from a convertible organopolysiloxane by dissolving the latter in a suitable solvent while simultaneously agitating the solution with water, and thereafter removing first the water and subsequently the solvent. Adaptation of this process for removing alkaline polymerizing agents required first solution to form a low viscosity system, contacting the solution with a sufficient amount of acidified water both to neutralize the alkaline agent and to effect washing of the polymer so as to remove the neutralization products. This was followed by subsequent water washing to remove the residual acid and to remove further the neutralization products contained in the convertible organopolysiloxane, and thereafter removing the solvent from the convertible organopolysiloxane.

The above methods while feasible in small scale operations were entirely impractical for commercial use because they were wasteful of neutralizing agents and required expensive solvents which introduced recovery problems as well as toxic and hazardous conditions. Simplification of this process was not believed feasible because low viscosity solutions were considered essential to effect intimate contact of the neutralizing medium with the polymerizing agent contained in the convertible organopolysiloxane. Finally, it was believed that if acid was employed in the neutralizing and washing operation, it was essential that any residual acid be substantially completely removed in order to avoid undesirable degradation of the polymer in future high temperature applications.

Unexpectedly, we have found that the aforementioned polymerizing agents can be removed from convertible organopolysiloxanes without requiring solvents, or neutralizing agents, and that such removal can be carried out relatively inexpensively and in short periods of time to effect substantially complete removal of the said polymerization agents. In addition, we have unexpectedly found that contrary to previous theories, the polymerizing agent could be removed without neutralization. Equally surprising was the fact that the use of boiling water in our process would not cause any detectable depolymerization of the polymer as had been expected despite the known degrading action of hot water on convertible organopolysiloxanes.

The convertible silicone compositions employed in the practice of the instant invention which may be highly viscous masses or gummy, elastic solids, depending on the state of condensation, the condensing agent employed, the starting organopolysiloxane used to make the convertible organopolysiloxane, etc. will hereinafter be referred to as "convertible organopolysiloxane" or, more specifically, as "convertible methyl polysiloxane." Although convertible organopolysiloxanes with which the present invention is concerned are well known, for purposes of showing persons skilled in the art the various convertible organopolysiloxanes which may be empyloyed in the practice of the present invention, attention is directed to the convertible compositions disclosed and claimed in Agens Patent 2,448,756, issued September 7, 1948; Sprung et al. Patent 2,448,556, issued September 7, 1948; Sprung Patent 2,484,595, issued October 11, 1949; Krieble et al. Patent 2,457,688, issued December 28, 1948; Hyde Patent 2,490,357, issued December 5, 1949; Marsden Patent 2,521,528, issued September 5, 1950, and Warrick Patent 2,541,137, issued February 13, 1951.

It will, of course, be understood by those skilled in the art that other convertible organopolysiloxanes containing the same or different silicon-bonded organic substituents (e. g., methyl, ethyl, propyl, phenyl, tolyl, xylyl, benzyl, phenylethyl, naphthyl, chlorophenyl, both methyl and phenyl, etc. radicals) connected to silicon atoms by carbon-silicon linkages, may be employed without departing from the scope of the invention. The particular convertible organopolysiloxane used is not critical and may be any one of those described in the foregoing patents which are generally obtained by condensation of a liquid organopolysiloxane containing an average of from about 1.95, preferably from about 1.98, to about 2.05 organic groups per silicon atom. The usual condensing agents which may be employed and which are well known in the art for that purpose may include, for instance, ferric chloride hexahydrate, phenyl phosphoryl chloride, alkaline condensing agents, such as potassium hydroxide, sodium hydroxide, etc. These convertible organopolysiloxanes generally comprise polymeric diorganosiloxanes which may contain, for example, up to 2 mol per cent copolymerized monoorganosiloxane, for example, copolymerized monomethylsiloxane, as well as low molecular weight linear polysiloxanes for control purposes, e. g., decamethyltetrasiloxane. Generally, we prefer to use as the starting liquid organopolysiloxane from which the convertible, for example, heat-convertible organopolysiloxane, is prepared, one which contains about 1.999 to 2.01, inclusive, organic groups, for example, methyl groups per silicon atom and where more than about 90 percent, preferably 95 percent, of the silicon atoms in the polysiloxane contain two silicon-bonded dialkyl groups.

The starting organopolysiloxanes used to make the convertible organopolysiloxane by condensation thereof preferably comprise organic substituents consisting essentially of monovalent organic radicals attached to silicon through carbon-silicon linkages, there being on the average between 1.95 and 2.25 organic radicals per silicon atom, and in which the siloxane units consist of units of the structural formula $R_2SiO$ where R is preferably a radical of the group consisting of methyl and phenyl radicals. At least 90 percent of the total number of R groups are preferably methyl radicals. The polysiloxane may be one in which all of the siloxane units are $(CH_3)_2SiO$ or the siloxane may be a copolymer of dimethylsiloxane and a minor amount (e. g., from 1 to 20 mol percent) of any of the following units, alone or in combination therewith: $C_6H_5(CH_3)SiO$ and $(C_6H_5)_2SiO$.

In the practice of our invention, the convertible organopolysiloxane is placed in a suitable mixer containing means for kneading the convertible organopolysiloxane. An apparatus which has been found eminently suitable for the purpose comprises a Baker-Perkins dough mixer having sigma-shaped blades rotating inwardly at differential speeds. This type of mixer has jacketed sides by means of which the convertible organopolysiloxane can be heated while it is being kneaded and washed. Referring specifically to the above-described apparatus (suitably designed Banbury mixers may also be used), it is advantageous to place the convertible organopolysiloxane in the mixer and add water thereto. The amount of water employed is critical in some respects and should not be too low in proportion to the organopolysiloxane in order to avoid emulsification difficulties. Moreover, the lack of sufficient water causes the formation of water pockets remaining as "dead spots" in either the apparatus or the organopolysiloxane being washed so that inadequate removal of the polymerizing agent will occur. Too much water may float the polymer out of reach of the blades and thereby prevent the necessary kneading of the convertible organopolysiloxane. Sufficient water should be used to obtain intimate contact with essentially all portions of the gum and to obtain the desired level of extraction of the polymerizing agent. All portions of the convertible organopolysiloxane should be below the surface of the water at some time in the processing in order to effect the maximum contact of the convertible organopolysiloxane with the wash water. In general, the amount of water used will depend upon such factors as the type of equipment employed, the convertible organopolysiloxane being treated, the type and concentration of polymerizing agent present in the convertible organopolysiloxane, etc. Generally, we have found that on a weight basis, for each part of convertible organopolysiloxane present in the kneading apparatus, there should be about 0.5 part or more of water. Amounts of water as high as three parts of the latter per part of convertible organopolysiloxane, or even higher ratios, may be used if desired as long as intimate dispersion of the water in the gum is obtained. We have found that good results are obtained by using weight ratios of one part water per part convertible organopolysiloxane.

The water used for treating purposes (which need not be exactly neutral but may be slightly acid or alkaline) may be either room temperature water or may be hot water and preferably ranges in temperature from about 75 to 100° C. We have found that cold water removes the polymerization agent faster at the beginning and less effectively at the end, whereas hot water removes the said agent somewhat slower at the beginning but more effectively at the end. Superheated water under pressure (e. g., at a temperature of 110° to 125° C.) may also be used.

The cycle time and the number of cycles for each charge of convertible organopolysiloxane may obviously be varied. Where a number of water treatments (i. e., cycles) are employed for each charge, and this is usually the optimum method for obtaining best results, the cycle time may range from as low as 15 minutes to as high as 2 hours or more. Although a single hot water wash of, for instance, 50 to 60 minutes will greatly reduce the concentration of an alkali-metal hydroxide polymerizing agent in the convertible methylpolysiloxane, even more satisfactory results are obtained by employing a number of cycles, for instance, about 2 to 3 or more cycles for periods ranging from about 10 minutes to about 1 to 1½ hours, per cycle. By the use of the repeated water treatments, a dilution effect is introduced so that the concentration of polymerizing agent in any entrained water from the previous cycle is greatly decreased, thereby effecting a substantial improvement in the effective removal of the polymerization agent.

The physical state of the convertible organopolysiloxane which can be advantageously used in the practice of our invention is critical and must conform to certain requirements. Thus, it has been found that if the viscosity of the convertible organopolysiloxane is too low, the process is unsatisfactory due to emulsification of the two phases. Generally, we have found that optimum results are obtained when the viscosity of the convertible organopolysiloxane is in excess of 500,000 centipoises and may range as high as 20,000,000 centipoises or more for the satisfactory practice of our claimed invention.

In practicing our invention, the convertible organopolysiloxane and water are subjected to the above-described kneading action (whereby the arms of the mixer are continually kneading the organpolysiloxane and simultaneously introducing the treating water into the mass being kneaded) in a suitable apparatus for a time and at a temperature readily determinable under the circumstances described above. Thereafter, the water is removed and fresh water introduced if subsequent water treatments are desired, while continuing the intensive kneading of the convertible organopolysiloxane. After the last water treatment has indicated that the polymerization agent has been removed either completely or to a sufficiently low concentration so as to have no harmful effects on the organopolysiloxane, it is usually desirable to remove the last trace of the water with steam or hot air while again continuing the kneading action, the air or steam being introduced in such manner so that a good portion of the latter is dispersed through the convertible organopolysiloxane, and then is permitted to escape with the vaporized treating water. Alternatively, one may also apply heat to the jacket of the mixer and simultaneously apply vacuum to remove the last traces of water. For the most part we have found it satisfactory to knead and heat the polymer, which is now in a relatively stabilized form as a result of the removal of the polymerizing agent, to temperatures of the order of about 100° C. so as to volatilize essentially all the residual or trapped water droplets.

If one is heating the treating water by means of heat being applied to the jacket of the mixer so that the entire mass, including the water and the convertible organopolysiloxane, is at an elevated temperature, care must be exercised that the organopolysiloxane films formed on the kettle face or other receptacle face immediately adjacent the point to which heat is being applied are not exposed to an excessive temperature, since at that point the temperature of the jacket may be much higher than can be tolerated by the convertible organopolysiloxane for too long periods of time. We have found that maintenance of the temperature of all surfaces in contact with the convertible organopolysiloxane below 175° C., particularly if supplemented by careful control of the mixing of the water with the polymer during the kneading action and careful atention to adequate and complete movement of the convertible organopolysiloxane throughout the kneading apparatus will avoid heat degradation of the aforesaid films in any cycle of reasonable length.

In order that those skilled in the art may better understand how the present invention may be practiced, the following examples are given by way of illustration and not by way of limitation. All parts are by weight. The convertible organopolysiloxane employed in the following examples was prepared by condensing at a temperature of 150° C. for about four hours octalmethylcyclotetrasiloxane with about 0.01 percent, by weight, potassium hydroxide. This polymer is a highly viscous, convertible, substantially non-flowable, polymeric dimethylsiloxane soluble in benzene and having only slight flow at room temperature. This convertible polymeric dimethyl siloxane will for brevity be hereinafter referred to a "polydimethylsiloxane" or as "gum."

In the following examples, the effectiveness of the treatment for removing the polymerizing agent was determined as follows. A two-gram sample of the gum was placed in an oven at 135° C. for 45 minutes under vacuum (to remove entrained moisture), recording the weight at the end of that time, and then heating the sample at 250° C. for twenty hours in an air-circulating oven. At the end of this latter heating period, the percentage weight loss based on the moisture-free sample was calculated. Usually, under these test conditions, a sample containing the small amount of polymerizing agent, for instance, potassium hydroxide, used for making the convertible organopolysiloxane from the low molecular weight organopolysiloxane will depolymerize almost 100 percent in weight to a low molecular weight product (about 500 or less molecular weight).

EXAMPLE 1

A series of three tests was carried out in a Baker-Perkins dough mixer using about 8 lbs. of the polydimethylsiloxane described above and 12 lbs. of water per charge. Samples of the convertible methylpolysiloxane were withdrawn periodically while kneading for stability tests as described above. In each test the polymer and water were charged to the Baker-Perkins mixer and the latter turned on so that its sigma-type blades revolved in opposite directions kneading the polymer while at the same time bringing the water into intimate contact with all parts of the polymer. At the end of each charge, the water was removed and a new charge of water, where indicated, was added. In some of the tests hot water (100° C.) was used, while in other tests, room temperature water (about 25° C.) was used. The following Table I shows the results of these various tests and water treatments conducted for varying lengths of time together with the percent in weight loss determined by means of the stability test described above.

Table I

TEST 1a

| Water [1] Used During Time Increment | Total Elapsed Treating Time, Min. | Percent Wt. Loss in Stability Test |
|---|---|---|
| Initial charge | 0 | 99.8 |
| Do | 10 | 97.9 |
| Do | 16 | 95.9 |
| Do | 22 | 94.7 |
| Do | 28 | 90.8 |
| Do | 35 | 84.2 |
| Do | 41 | 83.1 |
| Do | 51 | 35.3 |
| Do | 57 | 18.0 |
| Do | 63 | 13.5 |
| Do | 68 | 12.3 |
| 1st change | 83 | 6.8 |
| 2nd change | 93 | 4.2 |

TEST 1b

| Water [1] Used During Time Increment | Total Elapsed Treating Time, Min. | Percent Wt. Loss in Stability Test |
|---|---|---|
| Initial charge | 0 | 99.5 |
| 1st change | 15 | 98.3 |
| 2nd change | 35 | 94.1 |
| 3rd change | 55 | 39.1 |
| 4th change | 80 | 14.9 |
| 5th change | 100 | 7.0 |
| 6th change | 120 | 5.3 |
|  | 140 | 4.8 |

TEST 1c

| Water [2] Used During Time Increment | Total Elapsed Treating Time, Min. | Percent Wt. Loss in Stability Test |
|---|---|---|
| Initial charge | 0 | 99.5 |
| Do | 16 | 84.0 |
| Do | 32 | 65.9 |
| Do | 51 | 58.0 |
| Do | 71 | 33.1 |
| Do | 86 | 22.8 |
| Do | 104 | 17.1 |
| Do | 124 | 15.3 |
| Do | 172 | 12.5 |

Water heated to 100° C.

| 1st change | 206 | 7.7 |
| 2nd change | 256 | 4.4 |

[1] Water at 100° C.
[2] Water at 25° C.

From the above results it is apparent that kneading of the convertible methylpolysiloxane proceeds more effectively with the hot water than the cold.

The following Example 2 shows the rate of polymerization agent removal, specifically KOH removal from the above convertible methylpolysiloxane, during the water treatment. This rate of removal was determined by means of conductivity tests and correlates quite closely with the results described in Example 1.

EXAMPLE 2

Before conducting the water treatment, the resistance in ohms of potassium hydroxide in varying concentrations in aqueous solutions was determined using distilled water throughout. The following Table II shows the results of these standarization tests.

Table II

| Percent KOH | Resistance, ohms |
|---|---|
| 0.00129 | 6,800 |
| 0.00258 | 2,960 |
| 0.00644 | 1,015 |
| 0.01288 | 480 |

In carrying out this test, the convertible methylpolysiloxane described above containing potassium hydroxide was added to a Baker-Perkins dough mixer in the same way using the same proportions and procedure as described in Example 1. Thereafter, 100° C. water in a ratio of 1:1 on a weight basis with the convertible methylpolysiloxane, was added and the entire mixture subjected to the kneading action similarly as described in Example 1. The first charge of water was removed and new water added in the same ratio at the intervals recited in Table III below. Periodically, samples of the treating water were removed to determine the resistance in ohms and thus, by difference, the amount of KOH present in the convertible methylpolysiloxane. The following Table III shows the results of these various tests on samples of the convertible methylpolysiloxane as well as the percent weight loss determined for each sample by the stability test described above.

Table IV

EFFECT ON CYCLE TIME OF CHANGING WATER PRIOR TO REACHING 20 PERCENT WEIGHT LOSS

[Water temperature=100° C.]

| Number of Water Treatments Used in Reaching 20 Percent Weight Loss | Minutes to Reach 20 Percent Weight Loss | Ratio of Water/Gum per Cycle |
|---|---|---|
| 1 | 49 | 2.0 |
| 1 | 40 | 1.0 |
| 1 | 60 | 1.5 |
| Average | 50 | 1.5 |
| 2 | 37 | 1.5 |
| 2 | 54 | 1.5 |
| 2 | 70 | 1.0 |
| Average | 54 | 1.3 |
| 3 | 59 | 1.5 |
| 4 | 54 | 0.9 |
| Grand Average | 53 | 1.4 |

Table III

| Water Treatment Number | Elapsed Time, Min. | Percent 250° C. Weight Loss | Resistance of Diluted Sample, Ohms [1] | Percent KOH in Water | | Percent Removal From Gum [2] |
|---|---|---|---|---|---|---|
| | | | | Diluted | Undiluted | |
| 1st cycle | 0 | 99.0 | | | | 0 |
| | 20 | 94.3 | 6,200 | .00139 | .00347 | 43.4 |
| | 40 | 19.5 | 2,860 | .00267 | .00668 | 83.5 |
| | 80 | 15.1 | 2,700 | .00280 | .00700 | 87.5 |
| | 150 | 14.4 | 2,500 | .00300 | .00750 | 93.8 |
| 2nd cycle | 30 | 6.9 | (KOH content too small to be measured.) | | | |
| 3rd cycle | 30 | 6.0 | (KOH content too small to be measured.) | | | |

[1] To obtain greater accuracy of conductivity measurement, all samples were diluted 2.5/1.0 with distilled H₂O.
[2] Untreated gum (convertible methylpolysiloxane) contained 0.008 percent KOH by weight. Ratio of wash H₂O/gum in the above test was 1.0.

The ability to achieve such effective removal of polymerizing agent (to less than 0.0005 percent KOH) without forming a low viscosity solution of the polymer or without neutralization, as shown in the above example, was unexpected in view of the failures of previous attempts to achieve appreciable removal of the polymerizing agent directly from the high viscosity organopolysiloxane. It is also noteworthy that no areas of high local concentration of the polymerizing agent remained which would cause significant undesirable depolymerization.

EXAMPLE 3

In this example is described the effect of water treating time and changes of water on the removal of the polymerizing agent or catalyst, namely, potassium hydroxide. Various weight ratios of water to convertible methylpolysiloxane were used in this example. In each case the water and convertible methylpolysiloxane were charged to a Baker-Perkins mixer and kneaded and handled in the same manner as described in Example 1 employing the same technique in the removal of the water and addition of fresh water as described in the aforesaid Example 1. The following Table IV shows the effect on the cycle time of changing the water prior to reaching a 20 percent weight loss in the convertible methylpolysiloxane when measured by means of the test described above. Table V shows the effect of successive treatments with hot water after the weight loss of the convertible methylpolysiloxane had dropped below 20 percent. Table VI shows the results obtained under a variety of conditions of continuous kneading.

In the copending application of Robert L. Hatch and John F. Blumenfeld, Serial No. 396,068, filed concurrently herewith and assigned to the same assignee as the present invention, there is described a means for removing low boiling volatiles, i. e., volatile organopolysiloxanes boiling below 250° C. when measured at 760 mm. from convertible organopolysiloxane which have been obtained by polymerizing low molecular weight organopolysiloxane to the high molecular weight, convertible state. These volatile materials, referring specifically to the conversion of octamethylcyclotetrasiloxane to a convertible methylpolysiloxane, usually comprise, for instance, octamethylcyclotetrasiloxane, decamethylcyclopentasiloxane, and dodecamethylcyclohexasiloxane. The presence of these volatiles in the convertible organopolysiloxane undesirably affects the shrink characteristics of the converted or cured organopolysiloxane, and prevents satisfactory reduction in the compression set of the cured organopolysiloxane. In the aforesaid Hatch and Blumenfeld application, the means whereby these volatiles are removed from the convertible organopolysiloxane generally comprise subjecting the convertible organopolysiloxane to a kneading action while stripping the volatiles with an inert gas, such as air or steam at elevated temperatures. We have found that the treatment of the convertible organopolysiloxane to remove the polymerization catalyst can be combined with the devolatilization step so as to obtain the advantageous results from each operation substantially simultaneously. The following Example 4 describes a combined treatment of the convertible methylpolysiloxane to remove both the polymerization catalyst and the aforesaid volatiles.

Table V

EFFECT OF SUCCESSIVE TREATMENTS WITH FRESH WATER AFTER WEIGHT LOSS HAS DROPPED BELOW 20 PERCENT

[Water temperature=100° C.]

Treatment A=first complete treatment with fresh water after weight loss has dropped below 20 percent.
Treatment B=the treatment following Treatment A.
Treatment C=the treatment following Treatment B.

SHORT CYCLE PERIODS

| Test No. | Treatment A | | | Treatment B | | | Treatment C | | |
|---|---|---|---|---|---|---|---|---|---|
| | Duration, Minutes | Reduction in Percent Wt. Loss | Ratio, Water to Gum | Duration, Minutes | Reduction in Percent Wt. Loss | Ratio, Water to gum | Duration, Minutes | Reduction in Percent Wt. Loss | Ratio, Water to Gum |
| 1 | 15 | 5.5 | 1.3 | 10 | 2.6 | 1.3 | None | | |
| 2 | 15 | 7.9 | 0.7 | 15 | 1.7 | 0.7 | 15 | 0.5 | 0.7 |
| Ave | 15 | 6.7 | 1.0 | 13 | 2.1 | 1.0 | 15 | 0.5 | 0.7 |

LONGER CYCLE PERIODS

| Test No. | Duration, Minutes | Reduction in Percent Wt. Loss | Ratio, Water to Gum | Duration, Minutes | Reduction in Percent Wt. Loss | Ratio, Water to gum | Duration, Minutes | Reduction in Percent Wt. Loss | Ratio, Water to Gum |
|---|---|---|---|---|---|---|---|---|---|
| 3 | 30 | 7.5 | 1.0 | 30 | 0.9 | 1.0 | None | | |
| 4 | 30 | 0.8 | 1.5 | None | | | None | | |
| 5 | 30 | 5.5 | 1.5 | None | | | None | | |
| 6 | 30 | 3.8 | 1.2 | 30 | 1.3 | 1.2 | 30 | 0.7 | 1.2 |
| 7 | 30 | 7.4 | 1.5 | 30 | 2.6 | 1.5 | None | | |
| 8 | 30 | 4.8 | 0.8 | 50 | 3.3 | 0.8 | None | | |
| 9 | 40 | 2.2 | 1.5 | None | | | None | | |
| Ave | 31 | 4.6 | 1.3 | 35 | 2.0 | 1.1 | 30 | 0.7 | 1.2 |

Table VI

| Test No. | Water Treatment Number | Water Temp., °C. | Cycle Time [1] Min. | Percent Wt. Loss Reached | Gum Wt., Grams | H$_2$O Wt., Grams | Ratio H$_2$O/Gum |
|---|---|---|---|---|---|---|---|
| 10 | Initial gum | | | 99.8 | | | |
| | 1 | 100 | (10) | 97.9 | 2,964 | 6,000 | 2.02 |
| | 1 | 100 | (15) | 95.9 | | | |
| | 1 | 100 | (20) | 94.7 | | | |
| | 1 | 100 | (25) | 90.8 | | | |
| | 1 | 100 | (30) | 84.2 | | | |
| | 1 | 100 | (35) | 83.1 | | | |
| | 1 | 100 | (45) | 35.3 | | | |
| | 1 | 100 | (50) | 18.0 | | | |
| | 1 | 100 | (55) | 13.5 | | | |
| | 1 | 100 | (60) | 12.3 | | | |
| | 2 | 100 | 15 | 6.8 | 2,964 | 4,000 | 1.35 |
| | 3 | 100 | 10 | 4.2 | 2,964 | 4,000 | 1.35 |
| 11 | Initial gum | | | 99.5 | 4,385 | 6,000 | 1.37 |
| | 1 | 100 | 15 | 98.3 | 4,385 | 3,000 | 0.68 |
| | 2 | 100 | 15 | 94.1 | 4,385 | 3,000 | 0.68 |
| | 3 | 100 | 15 | 39.1 | 4,385 | 3,000 | 0.68 |
| | 4 | 100 | 15 | 14.9 | 4,385 | 3,000 | 0.68 |
| | 5 | 100 | 15 | 7.0 | 4,385 | 3,000 | 0.68 |
| | 6 | 100 | 15 | 5.3 | 4,385 | 3,000 | 0.68 |
| | 7 | 100 | 15 | 4.8 | 4,385 | 3,000 | 0.68 |
| 12 | Initial gum | | | 99.5 | | | |
| | 1 | 25 | (16) | 84.0 | 4,010 | 4,000 | 1.00 |
| | 1 | 25 | (32) | 65.9 | | | |
| | 1 | 25 | (51) | 58.0 | | | |
| | 1 | 25 | (71) | 33.1 | | | |
| | 1 | 25 | (86) | 22.8 | | | |
| | 1 | 25 | (104) | 17.1 | | | |
| | 1 | 25 | (124) | 15.3 | | | |
| | 1 | 25 | (172) | 12.5 | | | |
| | 2 | 100 | 30 | 7.7 | 4,010 | 3,000 | 0.75 |
| | 3 | 100 | 50 | 4.4 | 4,010 | 3,000 | 0.75 |
| 13 | Initial gum | | | 97.0 | 3,612 | 3,612 | 1.00 |
| | 1 | 100 | (20) | 94.3 | | | |
| | 1 | 100 | (40) | 19.5 | | | |
| | 1 | 100 | (60) | 14.2 | | | |
| | 1 | 100 | (80) | 15.1 | | | |
| | 1 | 100 | (100) | 15.4 | | | |
| | 1 | 100 | (120) | 13.8 | | | |
| | 1 | 100 | (150) | 14.4 | | | |
| | 2 | 100 | 30 | 6.9 | 3,612 | 3,612 | 1.00 |
| | 3 | 100 | 30 | 6.0 | 3,612 | 3,612 | 1.00 |
| 14 | Initial gum | | | 99.7 | | | |
| | 1 | 100 | 30 | 89.0 | 3,394 | 5,100 | 1.50 |
| | 2 | 100 | 30 | 14.6 | 3,394 | 5,100 | 1.50 |
| | 3 | 100 | 30 | 9.1 | 3,394 | 5,100 | 1.50 |
| 15 | Initial gum | | | 99.6 | | | |
| | 1 | 100 | (20) | 99.0 | 3,758 | 3,800 | 1.01 |
| | 1 | 100 | 40 | 85.7 | | | |
| | 2 | 100 | (60) | 38.4 | 3,758 | 3,800 | 1.01 |
| | 2 | 100 | 80 | 15.7 | | | |
| | 3 | 100 | (100) | 15.1 | 3,758 | 5,800 | 1.54 |
| | 3 | 100 | 120 | 13.5 | | | |

[1] Values in parentheses represent elapsed time within a cycle.

EXAMPLE 4

A convertible methylpolysiloxane (in varying amounts in the separate tests) consisting of the material described above and used in the foregoing examples, was charged to a Baker-Perkins dough mixer and water added thereto in amounts described in the following Table VII. This mixture of ingredients was thereafter subjected to a kneading action in the Baker-Perkins apparatus in the same manner as described above. The convertible methylpolysiloxane contained about 11.5 percent of the above-mentioned volatiles. The water used was water having a temperature of about 100° C. In carrying out the treatment without the use of supplemental stripping steam, 60 p. s. i. gage steam pressure was maintained on the Baker-Perkins mixer jacket during the water treatment period and the vapor boiling off was totally condensed. After each operating period of water treatment and evaporation, there was a certain short period of time (about 5 to 10 minutes) during which the remaining water was dumped and fresh hot water added. Boiling resumed shortly after each water addition. In addition to the runs in which only water treatment and distillation took place, another run was conducted in which similar proportions of convertible methylpolysiloxane were kneaded in the Baker-Perkins mixer, but in this instance the steam pressure in the jacket was maintained at about 85 p. s. i. gage and the vapor boiling off was supplemented by stripping steam which was passed into the mixer so as to remove the volatile materials in accordance with the procedure described in the above-mentioned Hatch and Blumenfeld application. The combined rate of steam (when employed) and vaporized water removed is shown in Table VII. The following Table VII shows the conditions and results of these water treatments and volatile removals on the above-described samples. The term "Oil" is intended to mean the volatiles recovered.

Table VII

A. NO STRIPPING STEAM EMPLOYED

Gum charged: 4,385 grams containing 11.5 percent volatiles
Water added: 6,000 grams initial charge, 3,000 grams after each dump
Water added at boiling temperature

| Elapsed Time Increments, Min. | | Vapor Condensed During Time Increment | | Grams/Min. | | Percent Volatiles In Gum by Difference |
|---|---|---|---|---|---|---|
| Operating | Down[1] | Oil | Grams, Water | Oil | Water | |
| 0 | ---- | 0 | 0 | ---- | ---- | 11.5 |
| 15 | 0 | 10 | 42 | 0.7 | 2.8 | 11.3 |
| 15 | 5 | 34 | 202 | 2.3 | 13.5 | 10.6 |
| 15 | 10 | 29 | 221 | 1.9 | 14.7 | 10.0 |
| 15 | 5 | 25 | 170 | 1.7 | 11.3 | 9.5 |
| 15 | 5 | 35 | 445 | 2.3 | 29.6 | 8.8 |
| 15 | 5 | 29 | 434 | 1.9 | 29.0 | 8.1 |
| 15 | 5 | 25 | 371 | 1.7 | 24.7 | 7.6 |
| 105 | 35 | 187 | 1,885 | ---- | ---- | -------- |

B. STRIPPING STEAM EMPLOYED

Gum charged: 3,771 grams volatiles content 11.0 percent
Water added: 5,650 grams each cycle

| Elapsed Time Increments, Min. | | Vapor Condensed During Time Increment | | Grams/Min. | | Percent Volatiles In Gum by Difference |
|---|---|---|---|---|---|---|
| Operating | Down[1] | Oil | Grams, Water | Oil | Water | |
| 0 | ---- | 0 | 0 | ---- | ---- | 11.0 |
| 31 | 0 | 80 | 2,010 | 2.6 | 65 | 9.1 |
| 30 | 14 | 70 | 1,720 | 2.3 | 57 | 7.3 |
| 30 | 12 | 40 | 1,560 | 1.3 | 52 | 6.3 |
| 91 | 26 | 190 | 5,290 | ---- | ---- | -------- |

Viscosity before above treatment: 5,300,000 cp. at 25° C. Viscosity after above treatment: 7,800,000 cp. at 25° C.
[1] Cycle interruption to change water.

The results described in Table VII show that the volatile materials can be removed from the convertible gum simultaneously as the latter is treated for the purpose of removing the polymerizing agent. The cycle is made simpler from a heat control viewpoint by permitting 10 to 20 percent (as shown in the attached table) of the water to boil overhead to the same line of condensers used for steam stripping the volatiles. It was surprising to find that even at 100° C. partial removal of the volatiles concurrently with removal of the polymerizing agent does not cause any depolymerization of the convertible organopolysiloxane. It should be noted that when a combination water treatment and devolatilization step is being used, excessive amounts of water should not be permitted to evaporate, and especially at the end of the first treatment there should not be less than 0.8 part water per part of the convertible methylpolysiloxane remaining; in succeeding treatments the weight ratio of water to convertible methylpolysiloxane should be at least 1 to 1.

It will, of course, be apparent to persons skilled in the art that other polymerizing agents, many examples of which have been given above, may be removed from the same organopolysiloxane described above or other organopolysiloxanes previously recited. Moreover, a variety of conditions other than those stated in the foregoing examples may be employed all within the scope of our invention. The amounts of the polymerizing agent removed by our process may be varied widely and amounts substantially below and above the concentration of polymerizing agent (which also includes concentrations of reaction products of alkaline polymerizing agents with the organopolysiloxanes to form organopolysiloxanes having the $$-\underset{|}{\overset{|}{\text{Si}}}-\text{OM grouping}$$

where M constitutes the metal ion of the alkaline condensing agent, for instance, potassium, sodium, cesium, etc.) may be readily removed. In this respect, concentrations of polymerizing agents ranging up to 4 to 5 percent of the weight of the organopolysiloxane may be readily removed by means of our process employing one or more water treatments in the manner described above. It is not essential that all the aforementioned polymerizing agent be removed from the organopolysiloxane since it may be desirable only to reduced the concentration of the polymerizing agent to a level where it will no longer exercise any undesirable effects on the organopolysiloxane in future processing and application. Of course, it will be apparent that in addition to removing water-extractable or water-soluble polymerizing agents present in the organopolysiloxane, one may also remove by means of our process other foreign materials which are water-extractable in the same manner.

The convertible organopolysiloxanes obtained in accordance with the present invention can be heated for relatively long periods of time without any undesirable change in properties. These convertible organopolysiloxanes now substantially free of the polymerizing agent may be compounded on ordinary rubber compounding differential rolls with various fillers, for example, various finely divided silicas, titanium dioxide, calcium silicate, ferric oxide, chromic oxide, cadmium sulfide, asbestos, glass fibers, calcium carbonate, carbon black, lithopone, etc., and molded, extruded or otherwise shaped as by heating under pressure to form products having physical characteristics, for example, elasticity, compressibility, etc., similar to those of natural rubber and other known synthetic rubbers. Organopolysiloxane resins or resin systems of suitable viscosity and kneadability containing small amounts of water-extractable materials it is desired to remove may also be treated in accordance with out invention for the above purpose.

Obviously, other additives may be incorporated in the convertible organopolysiloxanes obtained in accordance with our invention as, for instance, compression set additives such as mercury and mercury salts, certain quinones such as 2,5-ditertiarybutyl quinone, etc.

Products formed from compositions obtained in accordance with our invention have outstanding heat resistance at elevated temperatures of the order of about 200 to 250° C. and remain substantially unchanged when heated at such temperatures for times as long as from about 24 to 100 hours or more. The cured silicone products described herein, which are generally obtained by heating the convertible organopolysiloxane, filler and curing agent for times varying from about 15 to 50 minutes for about ¼ to 1 hour or more at temperatures of the order of about 100 to 150° C., and thereafter further heat-treating the sample at temperatures of the order of about 150 to 250° C. for times varying from about 1 to 2 hours to about 36 or more hours, are useful in many applications including, for instance, gaskets, tubing, electrical insulation (e. g., as conductor insulation, etc.), shock absorbers, etc. They are particularly suitable for use as gaskets in applications requiring resistance to high temperatures for extended periods of time, since the absence of the polymerizing agent permits maintenance of the gasket in a flexible, tight state for long periods of time without becoming brittle. Because of their resistance to heat, the products herein defined have value as materials for use in applications where natural and other synthetic rubbers fail owing to the deleterious effects of heat. Elastomers produced as a result of the practice of this invention have the additional property of retaining their flexibility at low temperatures as low as —40° C.

What we claim as new and desire to secure by Letters Patent of the United States is:

1. The process for removing small amounts of an alkaline polymerizing agent and volatile materials boiling below 250° C. when measured at 760 mm. from an organopolysiloxane having a ratio of from 1.98 to 2.01 organic groups per silicon atom, the organic groups being attached to silicon by carbon-silicon linkages and being selected from the class consisting of monovalent hydrocarbon radicals and chlorinated aryl radicals, the said organopolysiloxane containing the aforesaid polymerizing agent and volatile materials as a result of polymerizing a low molecular weight organopolysiloxane, in which the organic radicals are the same as those recited above, with the aforesaid alkaline polymerizing agent to a high molecular weight organopolysiloxane of a viscosity above 500,000 centipoises and being convertible to the cured, solid, elastic state, which process comprises (1) subjecting the said convertible organopolysiloxane to a kneading action in a dough mixer equipped with mixing arms while simultaneously intimately dispersing water having a temperature of from 75° to 125° C. and steam by means of this kneading action of the mixing arms through the said convertible organopolysiloxane, the water being present, by weight, in a ratio of at least 0.2 to 2 parts of the latter per part of convertible organopolysiloxane, and (2) thereafter removing from the kneading chamber (a) the treating water containing the polymerizing agent therein and (b) the volatile organopolysiloxanes in the form of vapors in the effluent stream.

2. The process for removing small amounts of an alkaline polymerizing agent and volatile materials boiling below 250° C. when measured at 760 mm. from a methylpolysiloxane having a ratio of from 1.98 to 2.01 methyl groups per silicon atom and containing these two variety of materials as a result of having polymerized a low molecular weight methylpolysiloxane with the aforesaid alkaline polymerizing agent to a high molecular weight methylpolysiloxane of a viscosity above 500,000 centipoises and being convertible to the cured, solid, elastic state, which process comprises (1) subjecting the said convertible methylpolysiloxane to a kneading action in a dough mixture equipped with mixing arms while simultaneously intimately dispersing water maintained at a temperature of from 75° to 125° C. and steam by means of this kneading action of the mixing arms through the said convertible methylpolysiloxane, the water being present, by weight, in a ratio of at least 0.2 to 2 parts of the latter per part of convertible methylpolysiloxane, and (2) thereafter removing from the kneading chamber the treating water containing the polymerizing agent contained therein and the volatile methylpolysiloxanes in the form of vapors in the effluent stream.

3. The process as in claim 2 in which the alkaline polymerizing agent is potassium hydroxide.

References Cited in the file of this patent

UNITED STATES PATENTS

| 2,459,387 | McGregor et al. | Jan. 18, 1949 |
| 2,469,883 | Marsden et al. | May 10, 1949 |
| 2,589,317 | Young | Mar. 18, 1952 |
| 2,760,893 | Koblitz et al. | Aug. 28, 1956 |

OTHER REFERENCES

Rochow: Chemistry of the Silicone, 2d ed., 1951, page 94, John Wiley and Sons, Inc., N. Y., N. Y. (Copy in Scientific Library)

Perry: Chemical Engineers Handbook, 3d ed., 1950, McGraw-Hill Book Co., Inc., pages 1207 and 1213.